(12) United States Patent
Krogman

(10) Patent No.: US 12,617,909 B1
(45) Date of Patent: May 5, 2026

(54) FREE STANDING METAL-ION DOPED THIN FILMS

(71) Applicant: Silverpeutics, Inc., Livermore, CA (US)

(72) Inventor: Kevin Krogman, Brookdale, CA (US)

(73) Assignee: Silverpeutics, Inc., Livermore, CA (US)

( * ) Notice: Subject to any disclaimer, the term of this patent is extended or adjusted under 35 U.S.C. 154(b) by 0 days.

(21) Appl. No.: 19/239,589

(22) Filed: Jun. 16, 2025

Related U.S. Application Data

(60) Provisional application No. 63/722,232, filed on Nov. 19, 2024, provisional application No. 63/715,547, filed on Nov. 2, 2024.

(51) Int. Cl.
B01J 47/016 (2017.01)
C08J 5/18 (2006.01)

(52) U.S. Cl.
CPC .............. C08J 5/18 (2013.01); B01J 47/016 (2017.01)

(58) Field of Classification Search
USPC ......................................................... 427/384
See application file for complete search history.

(56) References Cited

U.S. PATENT DOCUMENTS

| | | | | |
|---|---|---|---|---|
| 7,633,129 B1 * | 12/2009 | Shi | ..................... | G11C 13/0014 |
| | | | | 257/E51.023 |
| 7,691,773 B2 * | 4/2010 | Suh | ....................... | H01M 4/926 |
| | | | | 502/159 |
| 8,044,112 B2 * | 10/2011 | Matsuzawa | ............ | C08J 7/0427 |
| | | | | 427/407.1 |
| 8,234,998 B2 * | 8/2012 | Krogman | .............. | D06M 23/06 |
| | | | | 118/313 |

| | | | | |
|---|---|---|---|---|
| 8,313,798 B2 * | 11/2012 | Nogueira | ............... | G02B 5/208 |
| | | | | 427/164 |
| 9,387,505 B2 | 7/2016 | Krogman et al. | | |
| 9,393,589 B2 | 7/2016 | Olmeijer et al. | | |
| 11,492,598 B2 * | 11/2022 | Chang | ................ | G01N 33/5011 |
| 11,554,194 B2 | 1/2023 | Agarwal et al. | | |
| 2010/0003499 A1 | 1/2010 | Krogman et al. | | |
| 2014/0079884 A1 | 3/2014 | Krogman et al. | | |
| 2014/0079922 A1 | 3/2014 | Wang et al. | | |
| 2014/0242321 A1 | 8/2014 | Schmid et al. | | |
| 2014/0242393 A1 | 8/2014 | Olmeijer et al. | | |
| 2019/0064407 A1 | 2/2019 | Krogman et al. | | |
| 2020/0001245 A1 * | 1/2020 | Karnik | .............. | B01D 69/1216 |
| 2021/0230339 A1 * | 7/2021 | Ng | ......................... | C08F 220/14 |
| 2022/0190173 A1 * | 6/2022 | Dressick | ........... | H01L 21/02628 |

FOREIGN PATENT DOCUMENTS

| | | | | | |
|---|---|---|---|---|---|
| CA | 3170695 C | * | 10/2023 | ........... | C12N 5/0693 |
| WO | WO-2016033195 A1 | * | 3/2016 | ........... | G02B 5/0841 |
| WO | WO-2023219870 A1 | * | 11/2023 | ............... | C25B 1/04 |

OTHER PUBLICATIONS

Bastan et al, A paired emitter-detector diode-based photometer for the determination of sodium hypochlorite adulteration . . . , 2023, Scientific Reports vol. 13, p. 6217.

Choi et al, Influence of the degree of ionization on weak polyelectrolyte multilayer assembly, 2005, MacroMole vol. 38, pp. 116-124.

Mowiol Polyvinyl Alcohol, 1999.

Shiratori et al, pH-dependent thickness behavior of sequentially adsorbed layers of weak polyelectrolytes, 2000, Macromolc vol. 33, pp. 4213-4219.

Silver nanoparticles: optical properties, nanoComposix, 2024.

* cited by examiner

*Primary Examiner* — Brian K Talbot
(74) *Attorney, Agent, or Firm* — HelixIP LLP

(57) ABSTRACT

The present disclosure provides a thin film self-assembled from polymer(s), where the thin film includes a metal ion so it can further undergo ion exchange to incorporate an ion or blend of ions. Methods for making these thin films, subsequently top coating them so they can be freed from their original substrate, and methods of using these thin films are also disclosed.

17 Claims, No Drawings

FREE STANDING METAL-ION DOPED THIN FILMS

This application claims priority to U.S. provisional application Ser. No. 63/715,547 filed Nov. 2, 2024, and U.S. provisional application Ser. No. 63/722,232 filed Nov. 19, 2024.

BACKGROUND

Layer by layer (LbL) assembly is a process that builds surface coatings by alternately depositing two different and complementary materials. Alternation of the two materials forms bilayers, and bilayers are the building blocks of LbL coatings. The process commonly relies on electrostatic interactions and is self-limiting in each incremental deposition step. For example, charge-reversals that occur during the process eliminate the thermodynamic favorability of additional molecules being adsorbed to the growing film.

Skin wound healing involves multiple processes: (1) hemostasis, (2) inflammation, (3) proliferation, and (4) remodeling. Inflammation is a tissue defense mechanism, and provides resistance to microbial contaminations. Inflammation occurs almost simultaneously with hemostasis, and starts from within a few minutes to 24 h from injury and lasts for about 3 days. Proliferation starts at approximately day 3, in which keratinocytes and fibroblasts start to proliferate and migrate toward the wound. Failed regulation of any particular process results in pathologically compromised wound healing, such as chronic wounds, which are characterized by a prolonged or excessive inflammatory phase, persistent infections, and delayed wound contraction.

During the inflammatory phase, vascular contraction increases vascular permeability, allowing neutrophils, macrophages, and lymphocytes to invade. Cell proliferation is the next stage, and it is generally acknowledged that fibroblasts are necessary for both cell proliferation and the development of new blood vessels since they release collagen. During the remodeling phase, collagen near the injury site is reorganized, and angiogenesis activity is stopped. Additionally, collagenase then mediates the recycling of collagen, with too much collagen at the injury site eventually leading to the creation of hard scars.

SUMMARY

The disclosure here relates to thin films made from polymers such as poly(diallyl dimethyl ammonium chloride) (PDAC), polyacrylic acid (PAA), poly(styrene sulfonate) (PSS), poly(vinyl sulfonic acid), Chitosan, CMC, polyallylamine hydrochloride (PAH), hyaluronic acid, polysaccharides, DNA, RNA, proteins, LPEI, BPEI, polysilicic acid, poly(3,4-ethylenedioxythiophene) (PEDOT) and combinations thereof with other polymers (e.g. PEDOT:PSS), copolymers of the abovementioned, and the like. The weight-average molecular weight of the polymer may be about 50,000 Daltons or more, 40,000 Daltons or more, 30,000 Daltons or more, 20,000 Daltons or more, 15,000 Daltons or more, 10,000 Daltons or more, or 5,000 Daltons or more. In an aspect, the thin film is made from PAH (polyallylamine hydrochloride) and PAA (polyacrylic acid). One of or both of the PAH and PAA can be functionalized with trimethoxysilane.

Thin films of the disclosure can be made by using wet coating techniques to make a layer or layers of polymer(s), after which the wet film can be dried. Applicable wet coating techniques include, for example, reverse-roll coating, knifeover-roll coating, Meyer rod coating, gravure, slot-die, dip coating, spin coating, and spray coating. Other methods for making the thin films herein include, for example, immersion, inkjet, flexographic, metering rod, blade, air knife, curtain, melt extrusion, solvent casting and any combinations of the methods described above. These techniques can be applied using roll-to-roll techniques, whereby flexible substrate is passed over a series of rollers starting and ending with a wrapped roll of substrate, dipped techniques, whereby the substrate is submerged serially into baths of solution, or spray techniques, whereby the substrate is exposed serially to sprayed fluid comprising the desired solutions.

The thin films can include a metal and/or metal ion. The metal and/or metal ion can be any metal or metal ion including, for example, silver, gallium, or cerium. The silver, gallium, or cerium can be present in the thin film as an ion and/or in an uncharged state. The active agent can also be for example, metallic particles, and metal ion antimicrobial agents. The metal ion antimicrobial agent can be a metal ion, metal ion salt, or metal ion nanoparticle. The metal ion nanoparticle can be a silver nanoparticle to act as a reservoir of the active metal itself. The antimicrobial agent can be, for example, silver, chlorhexidine, antibiotics, polyhexamethylene biguanide (PHMB), iodine, cadexomer iodine, povidone iodine (PVI), hydrogen peroxide, and vinegar (acetic acid). Similarly, gallium can be incorporated as an active agent to provide antibiofilm functionality, or cerium can be incorporated as an active agent to benefit burn management by producing a hardened burn eschar.

In an aspect, thin films described herein can be used as a vehicle delivering desired levels of metal ion to aid or assist in wound healing. The thin films described herein can be incorporated into existing wound care therapies to add complimentary benefits. In an aspect, the thin film may be made of PAH and PAA. Such PAH/PAA thin films can deliver a payload included in the thin film. Exemplary payloads include, for example, metal ions such as silver, gallium and/or cerium. Other additives can be applied (e.g., as part of a secondary topcoat layer), e.g., when larger loading doses are required to achieve complimentary functionality.

DETAILED DESCRIPTION

Before the various embodiments are described, it is to be understood that the teachings of this disclosure are not limited to the particular embodiments described, and as such can, of course, vary. It is also to be understood that the terminology used herein is for the purpose of describing particular embodiments only, and is not intended to be limiting, since the scope of the present teachings will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described.

As will be apparent to those of skill in the art upon reading this disclosure, each of the individual embodiments described and illustrated herein has discrete components and features which can be readily separated from or combined with the features of any of the other several embodiments without departing from the scope or spirit of the present teachings. Any recited method can be carried out in the order of events recited or in any other order which is logically possible.

As used in this specification and the appended claims, the singular forms "a", "an" and "the" include plural referents unless the context clearly indicates otherwise. Thus, for example, reference to "a polypeptide" includes more than one polypeptide.

The section headings used herein are for organizational purposes only and not to be construed as limiting the subject matter described.

Definitions

As used herein and unless otherwise specified, the terms "coating" and "film" are used interchangeably.

As used herein, the terms "hard" "durable" and "durability" refer to the ability of a coating material to resist a stress or force, possess increased toughness, viscosity, modulus, or other material properties known in the art, or to resist deterioration, damage or degradation during a predetermined period of time, e.g., the lifetime of the material. The durability of a coating material may be characterized by its ability to maintain one or more properties of the material, such as but not limited to, appearance, strength, or an optical property (e.g., reflectance or haze). Appearance may be assessed by the observation of defects such as cracks, wrinkles and fogging. Strength may be assessed by any convenient standard test, e.g., the pencil test for film hardness (ISO 15184). In a durable coating such as those of the invention, such properties may be maintained over an extended period of time, such as, 1 day or more, 1 week or more, 1 month or more, 2 months or more, 3 months or more, 4 months or more, 5 months or more, 6 months or more, 12 months or more, 18 months or more, or even 24 months or more.

As used herein unless indicated otherwise, the term "ionic moieties" is meant to include moieties that are electrostatically charged at any pH (e.g., hard quaternary ammonium moieties), moieties that are electrostatically charged only at certain pH (e.g., primary, secondary, and tertiary amine moieties, carboxylic acids, etc.), and "ionizable moieties" (i.e., moieties that can be converted to an ionic moiety via a hydrolysis or substitution reaction). Examples of ionic moieties are amines (i.e. primary, secondary, tertiary, and quaternary amines), hydroxyl (including protected hydroxyl such as alkoxy and aryloxy), amides, thiol, acids (e.g., sulfinic acid), sulfinates, silanols, and carboxylic acid (including protected carboxylic acids such as carboxylates) and the like.

As used herein, the term "laminate" refers to a laminated product that includes at least one or two surfaces and a laminating material.

As used herein, the term "laminating material" refers to a material that can mate two surfaces or cover both sides of a single surface. For example, a laminating material may be a PVB substrate with a porous coating on top, or an adhesive material (which can include a porous coating) that allows the formation of a laminate.

As used herein, the term "oligomer" refers to a material that is soluble (e.g. water soluble) and has about 500 or less repeat units, or 200 or less, or 100 or less, or 50 or less, or 25 or less, or 10 or less.

As used herein, "partial thickness wound" refers to wounds that encompass Grades I-III; examples of partial thickness wounds include burn wounds, pressure sores, venous stasis ulcers, and diabetic ulcers. The term "deep wound" is meant to include both Grade III and Grade IV wounds. The present invention contemplates treating all wound types, including deep wounds and chronic wounds.

As used herein, reference to a "polyelectrolyte" intends a polymer material that contains or can be made to contain (e.g., by appropriately adjusting the pH of a solution containing the polyelectrolyte) a plurality of electrostatic charges. The term "polyelectrolyte" includes compounds or materials that contains multiple functional groups that maintain electrostatic interactions, dipole-dipole interactions or hydrogen bonding (e.g., alcohols, amines, sulfur-containing groups such as thionyl, polar groups such as carbonyls, and the like).

As used herein, "polymer multilayer" refers to the composition formed by sequential and repeated application of polymer(s) to form a multilayered structure. For example, hydrophilic polymer multilayers are polymer multilayers formed by the addition of polymers to a wound or support. The term "polymer multilayer" also refers to the composition formed by sequential and repeated application of polymer(s) to a wound or to a solid support. In addition, the term "polymer layer" can refer to a single layer composed of polymer molecules existing either as one layer within multiple layers on a wound or support. While the delivery of polymers to the wound bed or support can be sequential, the use of the term "polymer multilayer" is not limiting in terms of the resulting structure of the coating. It is well understood by those skilled in the art that inter-diffusion of polymers such as polyelectrolytes can take place leading to structures that may be well-mixed in terms of the distribution of the polymers used. It is also well understood by those skilled in the art that multilayer structures can be formed through a variety of interactions, including electrostatic interactions and others such as hydrogen bonding.

As used herein, the term "porous coating" refers to a porous coating covering a substrate, as well as any delamination products (e.g., films or particles) after a porous coating is removed from a substrate.

As used herein, "promote wound healing," "enhance wound healing," and the like refer to either the induction of the formation of granulation tissue of wound contraction and/or the induction of epithelialization (i.e., the generation of new cells in the epithelium). Wound healing is conveniently measured by decreasing wound area.

As used herein and unless otherwise specified, the term "solution" refers to a combination of at least one component in a liquid phase with at least one additional component dispersed or dissolved therein. The term includes homogeneous solutions (i.e., where the additional component is completely soluble in the liquid component). The term also includes mixtures (i.e., where the additional component is a solid that is not soluble or is not completely soluble in the liquid component).

As used herein, the term "sparingly soluble" refers to a material with a solubility of about 100 g/L or less, 50 g/L or less, 20 g/L or less, or 10 g/L or less, or 1 g/L or less, or 0.5 g/L or less, or 0.1 g/L or less.

As used herein and unless indicated otherwise, the term "substrate surface" (or sometimes simply "surface"), includes the surface of a substrate itself as well as the surface of any coatings deposited on the substrate (including a portion of a layer-by-layer coating), as well as a liquid layer present on a surface. Thus, for example, when a material is deposited on a substrate surface, the material may be deposited directly onto the surface of the substrate itself, or the material may be deposited onto the surface of a coating disposed on the substrate.

As used herein, "surfactant" refers to an amphiphilic material that modifies the surface and interface properties of liquids or solids. Surfactants can reduce the surface tension between two liquids. Detergents, wetting agents, emulsifying agents, dispersion agents, and foam inhibitors are all surfactants.

As used herein, the "thickness" of a bilayer refers to the average distance between the center of the nanoparticles that form the bilayer and the center of the nanoparticles that form an adjacent bilayer. With this definition, the following will be appreciated. First, the "center" of the nanoparticles of a given layer refers to a hypothetical plane intersecting the nanoparticles in such a way that minimizes the summation of the perpendicular distances between the plane and the center of each individual nanoparticle. Second, this definition is only relevant for a coating having more than one bilayer, and for a coating having "n" bilayers, only n−1 thicknesses are definable. Third, each bilayer having two adjacent bilayers (i.e. one above and one below) can have two thicknesses.

As used herein, by a "tightly packed" layer of nanoparticles is meant that the nanoparticles form a substantially homogeneous monolayer with a high packing density of nanoparticles. By high packing density, this includes packing arrangements that include hexagonal close packed, random close packed, and other close packings known in the art. In some embodiments the three-dimensional density of monodisperse nanoparticle is greater than 50%, or greater than 55% or greater than 60%. In some aspects the three dimensional density of monodisperse nanoparticle is between 50-64%, or 55-64, or 60-64%.

As used herein, "wound" refers broadly to injuries to the skin and subcutaneous tissue initiated in different ways (e.g., pressure sores from extended bed rest and wounds induced by trauma) and with varying characteristics. The methods and compositions described herein are useful for treatment of all types of wounds, including wounds to internal and external tissues, and wounds induced during medical procedures (e.g., surgical procedures) (e.g., abdominal surgery, hernia surgery, gastrointestinal surgery, bariatric surgery, reconstruction surgery, dural membrane surgery, etc.). Wounds may be classified into one of four grades depending on the depth of the wound: i) Grade I: wounds limited to the epithelium; ii) Grade II: wounds extending into the dermis; iii) Grade III: wounds extending into the subcutaneous tissue; and iv) Grade IV (or full-thickness wounds): wounds wherein bones are exposed (e.g., a bony pressure point such as the greater trochanter or the sacrum).

As used herein, "wound dressing" refers to materials placed proximal to a wound that have absorbent, adhesive, protective, osmoregulatory, pH-regulatory, or pressure-inducing properties. Wound dressings may be in direct or indirect contact with a wound. Wound dressings are not limited by size or shape. Indeed, many wound dressing materials may be cut or configured to conform to the dimensions of a wound. Examples of wound dressing materials include but are not limited to gauze, adhesive tape, bandages, and commercially available wound dressings including but not limited to adhesive bandages and pads from the Band-Aid® line of wound dressings, adhesive bandages and pads from the Nexcare® line of wound dressings, adhesive bandages and non-adhesive pads from the Kendall Curity Tefla® line of wound dressings, adhesive bandages and pads from the Tegaderm® line of wound dressings, adhesive bandages and pads from the Steri-Strip® line of wound dressings, the COMFEEL® line of wound dressings, adhesive bandages and pads, the Duoderm® line of wound dressings, adhesive bandages and pads, the TEGADERM™ line of wound dressings, adhesive bandages and pads, the OPSITE® line of wound dressings, adhesive bandages and pads, and biologic wound dressings. A "biologic wound dressing" is a type of wound dressing that comprises, e.g., is coated with or incorporates, cells and/or one or more biomolecules or fragments of biomolecules that can be placed in contact with the wound surface. The biomolecules may be provided in the form of an artificial tissue matrix. Examples of such biomolecules include, but are not limited, to collagen, hyaluronic acid, glycosaminoglycans, laminin, vitronectin, fibronectin, keratin, antimicrobial polypeptides and combinations thereof. Examples of suitable biologic wound dressings include, but are not limited to, BIOBRANE™, Integra™, Apligraf®, Dermagraft®, Oasis®, Transcyte®, Cryoskin® and Myskin®.

Polymers

The thin films of the disclosure can be made from polymers that are water soluble and bio-resorbable (biodegradable and biocompatible), for example polyvinyl alcohol (PVA), polycaprolactone (PCL), polylactic acid (PLA), poly (lactic-co-glycolic acid) (PLGA), polyurethane (PU), and polyethylene oxide/polyethylene glycol (PEO/PEG), polyvinylpyrrolidone (PVP). Other polymers that can be used to make the thin films include, for example, methyl methacrylate, ethyl methacrylate, methacrylic acid, styrene, benzyl acrylate and acrylic acid. The polymer can be a copolymer synthesized from monomers. Exemplary monomers for a copolymer include methyl methacrylate, ethyl methacrylate, methacrylic acid, styrene, benzylacrylate, acrylic acid, or other substances with similar characteristics. For example, the copolymer may be synthesized from at least two kinds of the above-mentioned monomers. Still other polymers include, for example, poly(diallyl dimethyl ammonium chloride) (PDAC), polyacrylic acid (PAA), poly(styrene sulfonate) (PSS), poly(vinyl sulfonic acid), Chitosan, CMC, polyallylamine hydrochloride (PAH), hyaluronic acid, polysaccharides, DNA, RNA, proteins, LPEI, BPEI, polysilicic acid, poly(3,4-ethylenedioxythiophene) (PEDOT) and combinations thereof with other polymers (e.g. PEDOT:PSS), copolymers of the abovementioned, and the like. The weight-average molecular weight of the polymer may be about 5,000 Daltons or more, 10,000 Daltons or more, 15,000 Daltons or more, 20,000 Daltons or more, 25,000 Daltons or more, 30,000 Daltons or more, 40,000 Daltons or more, 50,000 Daltons or more, 60,000 Daltons or more, 70,000 Daltons or more, 80,000 Daltons or more, 90,000 Daltons or more, 100,000 Daltons or more. In an aspect, the thin film is made from PAH (polyallylamine hydrochloride) and PAA (polyacrylic acid). One of or both PAH and PAA can be functionalized with trimethoxysilane.

Thin films described herein can be made from hydrophilic polymers such as polyvinyl alcohol (PVA), polydiallyldimethylammonium chloride, polyacrylic acid, sulfonated polystyrene, chitosan, chitin, carboxymethylcellulose, hyaluronic acid, polyvinylpyrrollidone, polyvinylalcohol, polyallylamine, polythiophenes, polyethyleneimines, polyacrylamides or copolymers or combinations thereof. In an aspect, the thin film is made from a hydrophilic polymer that is GRAS (generally regarded as safe) including, for example, polysaccharides, polyvinyl alcohol (PVA), chitosan, starch, alginate, dextran, dextrin, chitin, guar gum, gum karaya, agar, Fenugreek seed mucilage, Soy polysaccharide, Gellan gum, Mango peel pectin, *Lepidium sativum* mucilage, *Plantago ovata* seed mucilage, *Aegle marmelos* gum, Locust bean gum, *Lepidium sativum*, *Mangifera indica* gum, *Hibiscus rosa-sinensis* mucilage, carrageenan, hyaluronic acid, carboxymethylcellulose, carnauba wax, carob bean gum, carotene, cellulose, gelatin, gum Arabic, gum Ghatti, gum gualac, gum tragacanth, hydroxypropylmethyl cellulose, polyethylene glycol (PEG), methylcellulose, polyethylene glycol (PEG), propylene glycol.

Thin films described herein can also be made from other hydrophilic polymers such as, for example, polyacrylamide, poly(2-acrylamido-2-mewthylpropane sulfonic acid), poly (2-acrylamido-2-methylpropanesulfonic acid), poly(N,N-diethyl acrylamide), ploy(N-isopropyl acrylamide), poly(N,N-dimethyl acrylamide), poly(N,N-dimethylaminopropyl acrylamide), poly(N-phenethyl methylacrylamide), poly (acrylic acid), poly(alpha-ethylacrylic acid), poly(methacrylic acid), poly(alpha-propylacrylic acid), poly(2-aminoethyl methacrylate), poly(2-hydroxyethyl methacrylate), poly(N,N-dimethylaminoethyl methacrylate), poly(4-styrene sulfonic acid), poly(N-vinyl acetamide), poly(N-vinyl formamide), poly(N-vinyl isobutyramide), poly(vinylamide), poly(N-vinyl pyrrolidone) (PVP polymers), poly(2-vinyl pyrazine), poly(N-vinyl imidazole), poly(2-vinyl pyridine), poly(ethylene imine), poly(methyl vinyl ether), poly (oxymethylene), poly(tetrahydrofuran), polyglutamic acid, acrylic polymers and copolymers include acrylic acid, acrylamide, and maleic anhydride polymers and copolymers, for example alylamines, ethylenimines, oxazolines, and other polymers with amine groups in their main or side chains are examples of amine-functional polymers, ether polymers, fluorocarbon polymers, polystyrene polymers, poly(vinylchloride) polymers, natural polymers, semisynthetic polymers, and synthetic polymers. For example, see the polymers in Erothu et al, Hydrophilic Polymers (ed. Raju Francis and Sakthi Kumar), 2016, Wiley doi.org/10.1002/9783527690916.ch7, which is incorporated by reference in its entirety for all purposes. Other hydrophilic polymers that can be used in the thin films include, for example, polydiallyldimethyl ammonium chloride, polyacrylic acid, sulfonated polystyrene, chitosan, chitin, carboxymethylcellulose, hyaluronic acid, polyvinylpyrrolidone, polyvinyl alcohol, polyallylamine, polythiophenes, polyethyleneimines, polyacrylamides or copolymers or combinations thereof. In an aspect, the hydrophilic polymer is GRAS (generally regarded as safe) including, for example, polyvinyl alcohol (PVA), polysaccharides, chitosan, starch, alginate, dextran, dextrin, chitin, guar gum, gum karaya, agar, Fenugreek seed mucilage, Soy polysaccharide, Gellan gum, Mango peel pectin, *Lepidium sativum* mucilage, *Plantago ovata* seed mucilage, *Aegle marmelos* gum, Locust bean gum, *Lepidium sativum, Mangifera indica* gum, *Hibiscus rosa-sinensis* mucilage, carrageenan, hyaluronic acid, carboxymethylcellulose, carnauba wax, carob bean gum, carotene, cellulose, gelatin, gum Arabic, gum Ghatti, gum gualac, gum tragacanth, hydroxypropylmethyl cellulose, methylcellulose, polyethylene glycol (PEG), propylene glycol.

The hydrophilic polymers can be positively charged or negatively charged. Examples of positively charged polymers include, for example, poly(allylamine hydrochloride) (PAH), polyl-lysine (PLL), poly(ethylene imine) (PEI), poly (histidine), poly(N,N-dimethyl aminoacrylate), poly(N,N, N-trimethylaminoacrylate chloride), poly(methyacrylamidopropyltrimethyl ammonium chloride), and natural or synthetic polysaccharides such as chitosan. Examples of negatively charged polymers include, for example, poly (acrylic acid) (PAA), poly(styrenesulfonate) (PSS), alginate, hyaluronic acid, heparin, heparan sulfate, chondroitin sulfate, dextran sulfate, poly(methacrylic acid), oxidized cellulose, carboxymethyl cellulose, polyaspartic acid, and polyglutamic acid.

The thin films can also incorporate amphoteric polymers, alone in combination with the other polymers described herein. Amphoteric polymers include, for example, one or more of acrylic acid (AA), DMAEMA (dimethylaminoethyl methacrylate), APA (2-aminopropyl acrylate), MorphEMA (morpholinoethyl methacrylate), DEAEMA (diethylaminocthyl methacrylate), t-ButylAEMA (t-butylaminoethyl methacrylate), PipEMA (piperidinocthyl methacrylate), AEMA (aminoethyl methacrylate), HEMA (2-hydroxyethyl methacrylate), MA (methyl acrylate), MAA (methacrylic acid) APMA (2-aminopropyl methacrylate), AEA (aminoethyl acrylate). The amphoteric polymer can include (a) carboxylic acid, (b) primary amine, and (c) secondary and/or tertiary amine. The amphoteric polymers can have an isoelectric point of 4 to 8, preferably 5 to 7 and have a number average molecular weight in the range of 10,000 to 150,000.

The thin films can also be made from or include naphthoquinone diazosulfonic acid esters. Exemplary embodiments of the naphthoquinone diazosulfonic acid ester may include 2,3,4-trihydroxy benzophenone ester of naphthoquinone 1,2-diazo-5-sulfonic acid, 2,3,4,4'-tetrahydroxy benzophenone ester of naphthoquinone 1,2-diazo-5-sulfonic acid, or other substances with similar characteristics. The thin films can also be made from or include hydrogels, polymer films, foams, gauzes, and hydrocolloids. The thin film can be made of synthetic polymers such as synthetic polyelectrolytes. The thin can be made from naturally occurring polymers such as polysaccharides.

Other polymers that can be used to make the thin films are described in U.S. patent application Ser. No. 18/155,518, filed Jan. 17, 2023, (publication no. US20240009342) which is incorporated by reference in its entirety for all purposes.

The molecular weight of the hydrophilic polymer can be from 1-10 kDa, 1-20 kDa, 1-30 kDa, 1-40 kDa, 1-50 kDa, 1-60 kDa, 1-70 kDa, 1-80 kDa, 1-90 kDa, 1-100 kDa, 1-200 kDa, 1-300 kDa, 1-400 kDa, 1-500 kDa, 1-600 kDa, 1-700 kDa, 1-800 kDa, 1-900 kDa, 1-1000 kDa, 1-2000 kDa, 1-3000 kDa, 1-4000 kDa, 1-5000 kDa, 1-6000 kDa, 1-7000 kDa, 1-8000 kDa, 1-9000 kDa, 1-10000 kDa, 100 to 10000 kDa, 500 to 10000 kDa, 1000 to 10000 kDa, 50 to 500 kDa or 500 to 5000 kDa. The hydrophilic polymer can have a multimodal molecular weight distribution in the range 1 to 10000 Da, 100 to 10000 Da, 500 to 10000 Da, 1000 to 10000 Da, 50 to 500 Da or 500 to 5000 Da or can be a mixture of multiple polymers of unimodal or multimodal molecular weight distribution in the range 1-10000 Da, 100 to 10000 Da, 500 to 10000 Da, 1000 to 10000 Da, 50 to 500 Da or 500 to 5000 Da. The concentration of hydrophilic polymer in aqueous solution can be 1 to 10000 mM, 10 to 10000 mM, 100 to 10000 mM, 10 to 1000 mM, 10 to 500 mM, 10 to 50 mM, 1 to 50 mM, or 1 to 100 mM based on polymer repeat unit. The pH of the aqueous solution can be adjusted so that the hydrophilic polymer is at least 0.01% charged. The concentration of inorganic or organic salts can be from 1 to 10000 mM, 10 to 10000 mM, 100 to 10000 mM, 10 to 1000 mM, 10 to 500 mM, 10 to 50 mM, 1 to 50 mM, or 1 to 100 mM in the aqueous solution.

The thin films herein can have a surface area of at least 0.65, 1, 2, 5, 10, 100, 200, 300, 400, 500, 600, 700, 800, 900, 1,000, 2,000, 3,000, 4,000, or 5,000 square meters or from 0.65 to 1.0, 0.65 to 5.0, 0.65 to 10, 0.65 to 20, 0.65 to 50, 0.65 to 100, 0.65 to 200, 0.65 to 300, 0.65 to 400, 0.65 to 500, 1 to 10, 1 to 20, 1 to 50, 1 to 100, 1 to 200, 1 to 300, 1 to 400, 1 to 500, 1 to 600, 1 to 700, 1 to 800, 1 to 900 1 to 1,000, 2 to 10, 2 to 20, 2 to 50, 2 to 100, 2 to 200, 2 to 300, 2 to 400, 2 to 500, 2 to 600, 2 to 700, 2 to 800, 2 to 900, 2 to 1,000, 5 to 10, 5 to 20, 5 to 50, 5 to 100, 5 to 200, 5 to 300, 5 to 400, 5 to 500, 5 to 600, 5 to 700, 5 to 800, 5 to 900, 5 to 1,000, 10 to 20, 10 to 50, 10 to 100, 10 to 200, 10 to 300, 10 to 400, 10 to 500, 10 to 600, 10 to 700, 10 to 800, 10 to 900, 10 to 1,000, 20 to 50, 20 to 100, 20 to 200, 20 to 300, 20 to 400, 20 to 500, 50 to 100, 50 to 200, 50 to 300, 50 to 400, or 50 to 500, 50 to 600, 50 to 700, 50 to 800, 50 to 900, 50 to 1,000, 100 to 200, 100 to 300, 100 to 400, or 100 to 500, 100 to 600, 100 to 700, 100 to 800, 100 to 900, 100 to 1,000, 200 to 300, 200 to 400, or 200 to 500, 200 to 600, 200 to 700, 200 to 800, 200 to 900, 200 to 1,000, 300 to 400, or 300 to 500, 300 to 600, 300 to 700, 300 to 800, 300 to 900, 300 to 1,000, 400 to 500, 400 to 600, 400 to 700, 400 to 800, 400 to 900, 400 to 1,000, 500 to 600, 500 to 700, 500 to 800, 500 to 900, 500 to 1,000, 600 to 700, 600 to 800, 600 to 900, 600 to 1,000, 700 to 800, 700 to 900, 700 to 1,000, 800 to 900, 800 to 1,000, 900 to 1,000, 1,000 to 2,000, 1,000 to 3,000, 1,000 to 4,000, or 1,000 to 5,000 square meters.

Salts

In an aspect, counterions are added to or included with the polymers used to make the thin films. The counterions can be added in the form of a salt or salt solution. Exemplary salts include nitrates, chlorides, sulfates, acetates. Further examples of salts include calcium nitrate, aluminum nitrate, copper chloride, magnesium chloride, manganese chloride, sodium chloride, calcium chloride, potassium chloride, copper sulfate, magnesium sulfate, sodium acetate, calcium acetate, sodium carbonate, potassium carbonate, calcium carbonate, manganese carbonate, silver nitrate and/or silver acetate. Still further exemplar salts include halide salts such as chloride salts $LiCl$, $NaCl$, $KCl$, $CaCl2$, $MgCl2$, $NH4Cl$ and the like, bromide salts such as $LiBr$, $NaBr$, $KBr$, $CaBr2$, $MgBr2$, and the like, iodide salts such as $LiI$, $NaI$, $KI$, $CaI2$, $MgI2$, and the like, and fluoride salts such as $CaF2$, $MgF2$, $LiF$, $NaF$, $KF$, and the like. Further examples include sulfate salts such as $Li2SO4$, $Na2SO4$, $K2SO4$, $Ag2SO4$, $(NH4)2SO4$, $MgSO4$, $BaSO4$, $COSO4$, $CuSO4$, $ZnSO4$, $SrSO4$, $Al2(SO4)3$, and $Fe2(SO4)3$, as well as similar nitrate salts, phosphate salts, fluorophosphate salts, and the like. Monovalent salts can be selected. Multivalent salts can also be used, and combinations of monovalent and multivalent salts can also be used.

In an aspect, the positive counterion associated with the polymer should be subsequently exchangeable with silver, gallium, and/or cerium. Sodium, calcium, and protons (hydrogens) are easily exchanged out for silver, gallium, and/or cerium, the preference for which can be deduced from relative binding, or affinity, constants.

Active Agents and Additives

The active agent can be a metal, for example, silver, gallium, or cerium. The metal (e.g., silver, gallium, or cerium) can be present in the thin film as an ion and/or in an uncharged state. The active agent can also be for example, metallic particles, and metal ion antimicrobial agents. The metal ion antimicrobial agent can be a metal ion, metal ion salt, or metal ion nanoparticle. The metal ion nanoparticle can be a silver nanoparticle. The antimicrobial agent can be, for example, silver, chlorhexidine, antibiotics, polyhexamethylene biguanide (PHMB), iodine, cadexomer iodine, povidone iodine (PVI), hydrogen peroxide, and vinegar (acetic acid). An additive can be an antibiofilm agent such as, for example, small molecule antibiofilm agents, charged small molecule antibiofilm agents, antibiofilm polypeptides, antibiofilm enzymes, metallic particles, and metal ion antibiofilm agents. A metal ion antibiofilm agent can be a metal ion, metal ion salt, or metal ion nanoparticle. The metal ion antibiofilm agent can be a gallium ion, gallium ion salt, gallium ion nanoparticle, gallium alloy, or an alloy of gallium and silver. The antibiofilm enzyme can be Dispersin B.

Other additives useful for wound care and/or skin care can be included in the thin films (e.g., by dispersing directly in the topcoat layer) such as, for example, antibiotics, salicylic acid, hydroquinone, retinoids, hyaluronic acid, and/or vitamin C. Antibiotics can include, for example, aminoglycosides (e.g., gentamicin, amikacin, tobramycin, neomycin, and streptomycin), sulfonamides (e.g., Mafenide, Sulfacetamide, Sulfadiazine, Sulfadoxine, Sulfamethizole, Sulfamethoxazole, Sulfanilamide, Sulfasalazine), tetracyclines (e.g., lymecycline, methacycline, minocycline, rolitetracycline, and doxycycline), carbapenems (e.g., imipenem-cilastatin, meropenem, ertapenem, doripenem, panipenem-betamipron, and biapenem), cephalosporins (e.g., cefazolin, cephalexin, cefuroxime, cefoxitin, ceftriaxone, ceftazidime, cefepime, and ceftaroline), 2- and 4-quinolones (e.g., nalidixic acid, 6-fluoroquinolone, ciprofloxacin, ofloxacin, levofloxacin, moxifloxacin, balofloxacin, grepafloxacin, pazufloxacin, sparfloxacin, temafloxacin, gatifloxacin, and trovafloxacin), glycopeptides (e.g., vancomycin, teicoplanin, ramoplanin, oritavancin, dalbavancin, and telavancin), penicillin (e.g., amoxicillin, amoxicillin/clavulanic acid, ampicillin, benzylpenicillin, benzathine benzylpenicillin, dicloxacillin, flucloxacillin, and phenoxymethylpenicillin (Penicillin V)), rifamycin (e.g., rifampicin, rifabutin, rifapentine, and rifaximin), monobactams (e.g., tigemonam, nocardicin A, tabtoxin, azactam, aztreonam), oxazolidinone antibiotics (e.g., Linezolid, Sivextro, Tedizolid, and Zyvox), streptogramins (e.g., Quinupristin, pristinamycin, and virginiamycin), and polypeptide antibiotics (e.g., actinomycin, bacitracin, colistin, and polymyxin B).

The additive can also be a growth factor, a peroxide, a hemostatic agent, a bioactive peptide, a bioactive polypeptide, an analgesic, an anticoagulant, an anti-inflammatory agent, and a drug molecule or a drug compound. Still other additives can include, for example, surfactants, emulsifiers, wetting agents, rheology modifiers, plasticizers, emollients, humectants, disintegrants, lubricants, binders, compatibilizing agents, antistatic agents, and fillers. The additive can be any beneficial agent including, for example, salicylic acid, hydroquinone, retinoids, hyaluronic acid, and/or vitamin C.

The thin films can contain additives that kill microorganisms or inhibit the growth of microorganisms. In an aspect, the additive is a peroxide. The peroxide can be any peroxide including, for example, hydrogen peroxide, calcium peroxide, sodium peroxide, lithium peroxide, barium peroxide, magnesium peroxide, zinc peroxide, carbamide peroxide, benzoyl peroxide (e.g., for acne treatment), and hydrogen peroxide-urea.

The active agent and/or the additive can be applied to form a gradient in the thin film. In general, the gradients present a higher contraction of the active agent and/or the additive at one or more first desired locations and a lower concentration of active agent and/or the additive at one or second location. For example, the concentrations of the active agent and/or the additive can be layered in a thin film in a gradient such that higher concentrations are proximal to the application site (e.g., wound) than distal to the application site (e.g., wound) in a vertical fashion. The converse, where concentrations of compositions is greater distal to the application site (e.g., wound) than proximal, is also contemplated. Concentration of compositions in an application site (e.g., wound) wherein a horizontal gradient is deposited is also contemplated. Topographical gradients are also contemplated, wherein compositions are deposited such that the concentrations of compositions in an application site (e.g., wound) or on a biocompatible particle follow the topography of the substrate, for example, a higher concentration of compositions can be deposited in the valleys of undulations of an exemplary substrate compared to the peaks of the undulations.

The gradient can provide a higher concentration of the active agent and/or the additive in the center of the application site which transitions to a lower concentration of the active agent and/or the additive away from the center of the application site. Accordingly, when the thin film is applied to a site, the gradient results in a higher concentration of the active agent and/or the additive in the center of the application site and a lower concentration of active agent and/or additive as one moves to the periphery of the application site. The gradient can provide a lower concentration of the active agent and/or the additive in the center of the application site which transitions to a higher concentration of the active agent and/or the additive away from the center of the application site. Accordingly, the gradient results in a lower concentration of active agent and/or additive in the center of the application site and a higher concentration of active agent and/or additive as one moves to the periphery of the application site. If two or more active agents and/or additives are utilized, they can be presented as similar gradients or the gradients can be varied so that the concentrations of the two or more active agents and/or additives vary across the application site. The gradients of high or low concentration can be any shape, such as circular, square, rectangular, oval, oblong, etc. so that the matrix and gradient can conform to a variety of wound shapes. For example, for long, incision type wounds, the gradient may be centered on a longitudinal axis that extends along the length of the wound and can be centered on the wound. As another example, the gradient can be circular or oval-shaped for application to open type wounds, burns, sores and ulcers that are roughly circular or oval. The gradients can comprise a series of features arranged in a pattern. For example, the gradients can form a series of stripes or high and low concentrations of one or more active agent and/or additives along a longitudinal axis of the matrix. Alternatively, the gradients can form a checkerboard pattern, array, concentric circles, overlapping circles or oval, etc.

Solvents

The thin films described herein are prepared using deposition solutions that comprise a solvent. Each solution used in the deposition process may have a solvent, and the identity of the solvent is independently selected based on the needs of the solution and the overall process. For example, each of the deposition solutions may have a solvent, and the rinse solution may also have a solvent. The solvent in the deposition and rinse solutions need not be the same, although in some applications they are the same.

The solvents can be selected from polar protic or aprotic solvents. Examples of polar protic solvents include water and organic solvents such as alcohols (ethanol, methanol, etc.) and acids (formic acid, etc.). Examples of polar aprotic solvents include ethers such as tetrahydrofuran, dimethyl ether, and diethyl ether, sulfoxides such as dimethyl sulfoxide, and amides such as dimethyl formamide. In some aspects, mixtures of such solvents are also suitable. For example, a mixture of an alcohol and water such as a 95/5 mixture of water and ethanol may be used for the deposition solutions, the rinse solution, or both. In some aspects, water is used for the deposition solutions and the rinse solution. In some aspects, water containing salts and other additives is used for the deposition and rinse solutions.

Salt in the deposition solutions and/or rinse solutions may be a pH modifying agent. Such pH modifying agents include strong and weak acids and bases that are commonly used as buffers. For example, sodium hydroxide, hydrochloric acid, ammonium hydroxide, acetic acid, tetramethylammonium hydroxide, tetraethylammonium hydroxide, nitric acid, and the like may be used.

Methods for Making Thin Films

When charged polymers are used to make the thin film, the charge on the polymers is balanced so that (1) ion repulsion will push the polymer into a linear-rod shape for packing into the film, (2) the charge of the polymers is low enough so that a first layer of polymer can form on a hydrophobic substrate (the polymers need less charge), and (3) sufficient charge so the positively charged polymers and the negatively charged polymers can interact ionically to form layers. In an example, the film can be made from a positively charged polymer (cation) which can be polyallylamine hydrochloride (PAH) and a negatively charged polymer which can be polyacrylic acid (PAA). The charge of the polymers can be reduced by adjusting the pH near to the pKa of polymers (H+ neutralize the charges of the carboxylic acids). The distance over which the charge of the polymers is felt can also be reduced with counter ions, (e.g., an appropriate salt). The charge of carboxylic acid groups of the polymers can be reduced by using positively charged metal ions (cations), which preferentially bind to and protect charged moieties along the polymer chain. Salts that can be used include salts of metals that are (1) EPA safe, (2) inexpensive, and (3) good candidates for ion exchange with desired payloads (e.g., Ag, Ga and Cc).

Examples of salts that can be used include, for example, chloride salts such, for example, as LiCl, NaCl, KCl, CaCl2, MgCl2, NH4Cl; bromide salts such as, for example, LiBr, NaBr, KBr, CaBr2, MgBr2; iodide salts such as, for example, LiI, NaI, KI, CaI2, MgI2; and fluoride salts such as, for example, CaF2, MgF2, LiF, NaF, KF. Other examples include sulfate salts such as, for example, Li2SO4, Na2SO4, K2SO4, Ag2SO4, (NH4) 2SO4, MgSO4, BaSO4, COSO4, CuSO4, ZnSO4, SrSO4, Al2(SO4)3, and Fe2(SO4)3, as well as similar nitrate salts, phosphate salts, fluorophosphate salts, etc.

Thin films (e.g., PAH-PAA films) can be made using formulations of polymers that are known in the art. See, for example, Joly et al., Multilayer nanoreactors for metallic and semiconducting particles, 2000, Langmuir 16:1354-1359, which is incorporated by reference in its entirety for all purposes. These formulations (e.g., PAH/PAA) can be coated onto a silicone release substrate, optionally topping the thin film with a water-soluble layer of poly(vinyl alcohol), and subsequently peeling off the silicone release substrate to produce a free-standing film. The pH of the PAH formulation for the first polymer layer is at or above it's pKa (~9.5) in order to fully wet the hydrophobic silicone surface before the first PAA anion exposure.

A thin layer of the cation deposition formulation is applied to the substrate (e.g., a silicone release substrate) and the polymers are provided sufficient time to diffuse to the surface of the substrate. A rinse solution can be applied to the substrate with the thin film after each layer is deposited. The rinse solution can comprise any solvent mentioned above, and in some aspects the rinse solution contains the same solvent as the deposition solutions. The rinse solution is removed using a diffusion barrier removal step that leaves behind a thin layer of solvent (e.g., 2-5 microns). The diffusion barrier removal step can use any method to remove the excess rinse solution including, for example, an air knife, a vacuum, a heated blower, a squeegee nip, and/or adding a lower boiling co-solvent such as alcohol. A thin film of the anion deposition formulation is then applied to the substrate followed by a rinse step and a diffusion barrier removal step. The deposition formulations and rinse formulations may be applied to the substrate using any methods known in the art including, for example, spray, dip, gravure, curtain coating, slot die, or knife coating. The polymer deposition steps (either cation or anion formulations) with the rinse and diffusion barrier removal steps are repeated 5-10, 5-15, 5-20, 5-25, 5-30, 5-40, 5-50, 10-15, 10-20, 10-25, 10-30, 10-40, 10-50, 15-20, 15-25, 15-30, 15-40, 15-50, 20-25, 20-30, 25-30, 25-40, 25-50, 30-40, 30-50, or 40-50 times. The polymer deposition steps (either cation or anion formulations) with the rinse and diffusion barrier removal steps are repeated 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 times. After the deposition is complete, the substrate with the thin film is dried by any of the methods known in the art. For example, a hot air convection dryer, an air knife, exposure to ambient air, etc.

During the thin film forming process, each cation or anion deposition formulation is exposed to the substrate for 1-10, 1-20, 1-30, 5-10, 5-15, 5-20, 5-25, 5-30, 10-15, 10-20, 10-25, or 10-30 seconds. During the thin film forming process, each cation or anion deposition formulation is exposed to the substrate for 1, 2, 3, 4, 5, 6, 7, 8, 9, 11, 12, 13, 14, 15, 16, 17, 18, 19, 20, 21, 22, 23, 24, 25, 26, 27, 28, 29, or 30 seconds.

In between polymer deposition steps, the methods herein can include a diffusion barrier removal step. The diffusion barrier removal step removes solvent from the substrate leaving a thin film of solvent on the substrate. The thin film of solvent can be 1-5 μm, 1-10 μm, 1-15 μm, 1-20 μm, 1-25 μm, 2-5 μm, 2-10 μm, 2-15 μm, 2-20 μm, 2-25 μm, 3-5 μm, 3-10 μm, 3-15 μm, 3-20 μm, 3-25 μm, 4-5 μm, 4-10 μm, 4-15 μm, 4-20 μm, 4-25 μm, 5-10 μm, 5-15 μm, 5-20 μm, or 5-25 μm. The layer of solvent remaining should allow the polymer molecules of the next deposition step to reach the film on the substrate in 1-5 seconds, 1-10 seconds, 1-20 seconds, 1-25 seconds, 5-10 seconds, 5-15 seconds, 5-20 seconds, 5-25 seconds, 10-15 seconds, 10-20 seconds, or 10-25 seconds. The layer of solvent remaining should allow the polymer molecules of the next deposition step to reach the film on the substrate in 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 seconds.

The methods described herein can make thin films on large substrates. The large substrates can be defined by area, size of sheet (dimensions), width of roll and length/speed of substrate processed. The width of a roll used for making thin films can be any size including, for example, 10-20 inches, 10-30 inches, 10-40 inches, 10-50 inches, 10-60 inches, 10-70 inches, 10-80 inches, 10-90 inches, 10-100 inches, 10-110 inches, 10-120 inches, 1-5 feet, 1-10 feet, 1-15 feet, 1-20 feet, 1-25 feet, or 1-30 feet. The width of a roll used for making thin films can be any size including, for example, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 inches. The width of a roll used for making thin films can be any size including, for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 feet. The width of a roll used for making thin films can be any size including, for example, more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 feet. The length of the roll can be any length including, for example, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 feet. The length of the roll can be any length including, for example, more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 feet.

The area of the large substrate can be, for example, 5-10, 5-15, 5-20, 5-25, 5-30 square feet. The area of the large substrate can be, for example, 5, 6, 7, 8, 9, 10, 11, 12, 13, 14, 15, 16, 17, 18, 19, 20, 21, 22, 23, 24, 25, 26, 27, 28, 29, or 30 square feet.

The thin film can be subjected to an ion exchange process. A solution containing the desired metal ion can be applied to the thin film and the desired metal ions are provided sufficient time to diffuse into the thin film and exchange with metal ions in the thin film. A rinse step removes the excess metal ion solution, optionally the thin film is subjected to a diffusion barrier removal step (as described above), and a solution with a reducing agent (electron donor) is exposed to the thin film. The reducing agent can reduce or eliminate the charge of the metal ion in the thin film. A rinse step removes the excess reducing agent, and optionally the thin film is subjected to a diffusion barrier removal step (as described above). The above steps (metal-rinse-reducing agent-rinse) is repeated for the desired number of cycles. Optionally the last few cycles or last cycle can exclude the reducing agent step so that some metal ion is left in the thin film. The above steps can be repeated 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 times. The time for each ion exchange step can be 15-20 seconds, 15-30 seconds, 15-40 seconds, 15-50 seconds, 15-60 seconds, 20-30 seconds, 20-40 seconds, 20-50 seconds, 20-60 seconds, 30-40 seconds, 30-50 seconds, 30-60 seconds, or more than 20 seconds, 30 seconds, 40 seconds, 50 seconds, or 60 seconds. The time for each ion exchange step can be 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 seconds. The time for each ion exchange step can be 1, 2, 3, 4, 5, 6, 7, 8, 9, or 10 minutes.

Metal ion solutions for the ion exchange step can contain 1-10 mM, 1-15 mM, 1-20 mM, 1-25 mM, 1-30 mM, 1-35 mM, 1-40 mM, 1-45 mM, 1-50 mM, 5-10 mM, 10-15 mM, 10-20 mM, 10-25 mM, 10-30 mM, 10-35 mM, 10-40 mM, 10-45 mM, 10-50 mM, 15-20 mM, 15-25 mM, 15-30 mM, 15-35, mM, 15-40 mM, 15-45 mM, 15-50 mM, or 20-25 mM metal ions (e.g., silver ions). Metal ion solutions for the ion exchange step can contain 1-5 mM, 2-5 mM, 2.9-3.2 mM, 3-5 mM, 4-5 mM, 5-9 mM, 6-10 mM, 7-10 mM, 8-10 mM, 9-10 mM, metal ions (e.g., silver ions). The reducer solution can contain sufficient reducing agent (e.g., sodium borohydride) to maintain a reductive potential, for example, of between −100 and −200 mV, −100 and −300 mV, −100 and −400 mV, −100 and −500 mV, −100 and −600 mV, −100 and −700 mV, −100 and −800 mV, −100 and −1000 mV, −200 and −300 mV, −200 and −400 mV, −200 and −500 mV, −200 and −600 mV, −200 and −700 mV, −200 and −800 mV, −200 and −1000 mV, −300 and −400 mV, −300 and −500 mV, −300 and −600 mV, −300 and −700 mV, −300 and −800 mV, −300 and −1000 mV, −400 and −500 mV, −400 and −600 mV, −400 and −700 mV, −400 and −800 mV, −400 and −1000 mV, −500 and −600 mV, −500 and −700 mV, −500 and −800 mV, −500 and −1000 mV, or −330 to −350 mV.

Thin films described herein can be made using any wet coating techniques known in the art, after which the wet film has to be dried to remove the solvent by convection using hot air, to speed things up, or ambient air. Applicable wet coating techniques include, for example, reverse-roll coating, knife-over-roll coating, Meyer rod coating, gravure, slot-die, dip coating, spin coating, and spray coating. Other methods for making the thin films herein include, for example, immersion, inkjet, flexographic, metering rod, blade, air knife, curtain, melt extrusion, solvent casting and any combinations of the methods described above. Sec, e.g., US PAT PUBL. 20140079884, US PAT PUBL. 20160068703, US PAT PUBL. 20120269973, US PAT PUBL. 20160114294, US PAT PUBL. 20140112994, US PAT PUBL. 20150086599, Shiratori, Japanese Journal of Applied Physics Vol. 44, No. 3, 2005, L126-L128, and Grunlan, Industrial & Engineering Chemistry Research Vol. 53, 2014, 6409-6416, all of which are incorporated herein by reference in their entirety.

Reverse-roll coating utilizes a roller in close proximity to a moving web, which roller spins in the reverse direction of the plastic, forming a bead of fluid that travels with the passing plastic based on the gap between roller and plastic, and the viscosity of the solution. Reverse roll coating is described in, for example, Alonso et al., Process viscosity in reverse roll coating, Chemical Engineer. Res. Design 79:128-136 (2001); Ostness, Coating technology for flexible packaging, tappi.org/content/enewsletters/eplace/2006/06PLA50.pdf; Kapur, Flow phenomena in fixed-gap and gravure roll coating systems, etheses.whiterose.ac.uk/929/1/uk_bl_cthos_366501.pdf; ali et al., Theoretical study of the reverse roll coating of non-isothermal magnetohydrodynamics viscoplastic fluid, Coatings 10:940 (2020), each of which is incorporated by reference in its entirety for all purposes. Reverse-roll coating processes can be performed on commercially sold machines including, for example, those sold by New Era Converting Machinery Inc., Xiamen Simy Equipment Limited Co., Ltd., Dubois Equipment Company, LLC, Schaefer Machine Co., Pyradia Belfab, Technical Coating International, and the Union Tool Corporation.

Knife-over-roll coating uses a tapered blade positioned slightly above a passing web of plastic, allowing only a thin layer of fluid to remain on the plastic as it passes underneath. Knife over roll coating is described in, for example, Herrera, Versatility in coating operations-knife coatings, Coated Fabrics. 1991; 20(4):289-301. doi: 10.1177/152808379102000408; Coyle, D. J. (1997). Knife and Roll Coating. In: Kistler, S. F., Schweizer, P. M. (eds) Liquid Film Coating. Springer, Dordrecht. doi.org/10.1007/978-94-011-5342-3_15; Grant, Application of Coatings to Continuous Webs. Journal of Coated Fabrics. 1977; 7(1):43-57, doi: 10.1177/009346587700700104, each of which is incorporated by reference in its entirety for all purposes. Knife-over roll coating processes can be performed on commercially sold machines including, for example, those sold by Jessup Manufacturing Company, Delpro Limited, US Web Converting Machinery Corporation, National Coating Corporation, and Technical Coating International.

Meyer rod coating uses a rod with a spiral wrapped wire positioned such that it barely touches a passing plastic surface. The wire touches the film surface, and the rod in the middle is separated from the surface by the wire diameter. Only fluid which can fit through the gaps in the wire voids is allowed to remain on the passing plastic. Once it passes the Meyer rod the peaks and troughs created by the wire smooth out and level themselves prior to curing. Meyer rod coating is described in Kim et al, Multi-purpose overcoating layers based on PVA/silane hybrid composites for highly transparent, flexible, and durable AgNW/PEDOT:PSS films, RSC Adv. 6:19280-19287 (2016); Li et al., Roll-to-roll fabricating MXene membranes with ordered interlayer distanced for molecule and ion separation, Adv. Mater. Interfaces vol. 10, DOI:10.1002/admi.202300301 (2023), each of which is incorporated by reference in its entirety for all purposes. Meyer rod coating processes can be performed on commercially sold machines including, for example, those sold by Conversion Technologies, Inc., and Xiamen Simy Equipment Limited Co., Ltd.

Gravure uses a dimpled roller that dips into a trough of fluid and carries only what it can hold by surface tension out of the pan, a doctor blade scrapes the surface of the pits such that only fluid contained in the volume of the pits is allowed to remain. This dimpled roller then presses against a passing plastic surface, which is pressed into the dimples sufficiently to draw out all the fluid. These tiny mounds of fluid then settle into a liquid sheet of prescribed thickness before drying. Gravure coating is described in, for example, Wang et al., Large-area Gravure-printed AgNWs electrode on water/oxygen barrier substrate for long-term stable large-area flexible organic solar cells, Chinese J. Chem. 42:478-484 (2023); Kopola et al., High efficient plastic solar cells fabricated with a high-throughput gravure printing method, Solar Energy Mat. Solar Cells 94:1673-1680 (2010); Sato et al., Stretchable, adhesive and ultra-conformable elastomer thin films, Soft Matter 12:9202-9209 (2016), each of which is incorporated by reference in its entirety for all purposes. Gravure coating processes can be performed on commercially sold machines including, for example, New Era Converting Machinery, Inc., Retroflex, Inc., Pyradia Belfab, Hirano Tecseed Co., Ltd., and Kerone Engineering Solutions, Inc.

Slot-die uses fluid that is metered onto a passing plastic surface by pressure through a narrow precisely machined slot between two metal surfaces. This technique requires very precise machining and a defect free gap between the two. Slot-die is described in, for example, Parsekian et al., Scalable, alternating narrow stripes of polyvinyl alcohol support and unmodified PEDOT:PSS with maintained conductivity using a single-step slot die coating approach, ACS Appl. Mater. Interfaces 12:3736-3745 (2020); Jeong et al., Scaled production of functionally gradient thin films using slot die coating on a roll-to-roll system, ACS Appl. Mater. Interfaces 16:9264-9274 (2024); Lin et al., Minimum wet thickness for double-layer slide-slot coating of poly(vinyl-alcohol) solutions, Polymer Engineer. Sci. 45:1590-1599 (2005), each of which is incorporated by reference in its entirety for all purposes. Slot-die processes can be performed on commercially sold machines including, for example, Ossila, FOM Technologies, MTI Corporation, MIRWEC Coating, and nTact.

In dip coating a passing plastic surface is submerged into a pan of fluid as it rides around a roller face. Anything that carries along and doesn't drain back into the pan is dried into a sheet of film. This technique is only applicable for specific viscosity ranges and speeds. In dip coating is described in, for example, Schiessl et al., Nanocomposite coatings based on polyvinyl alcohol and montmorillonite for high-barrier food packaging, Sec. Nutrition Food Sci. Technol. Vol. 9, doi.org/10.3389/fnut.2022.790157 (2022); Sinturel et al., Influence of PLGA nanoparticles on the deposition of model water-soluble biocompatible polymers by dip coating, Colloids and Surfaces A: Physiochemical and Engineering Aspects, 608:125591 (2021), each of which is incorporated by reference in its entirety for all purposes. In dip coating processes can be performed on commercially sold machines including, for example, Xiamen Tmax Battery Equipment Limited., Ossila, Specialty Coating Systems, Inc., MSE Supplies, LLC, and PAR Systems.

Spin coating uses a fluid applied to the middle of a spinning substrate. As viscous forces overcome inertial forces, the fluid coats the surface as a thin layer. This technique is limited in size of substrate to that which can be spun safely. Spin coating is described in, for example, Manikandan et al., Construction of spin coating machine controlled by arm processor for physical studies of PVA, Intl J. Electronics Electrical Engineer. 3:318-322 (2015); Augustine et al., Excellent UV absorption in spin-coated thin films of oleic acid modified zinc oxide nanorods embedded in Polyvinyl alcohol, J. Phys. Chem. Solids 73:396-401 (2012); Moreira et al., Spin-coated freestanding films for biomedical applications, J. Mat. Chem. B, 9:3778-3799 (2021), each of which is incorporated by reference in its entirety for all purposes. Spin coating processes can be performed on commercially sold machines including, for example, Ossila, Specialty Coating Systems, Inc., Holmarc Opto-Mechatronics Ltd., MTI Corporation, and MicroNano Tools.

Spray coating sprays fluid onto a surface but uniformity is challenging or very expensive equipment is required. Spray coating is described in, for example, Wei et al., Constructing anti-scaling and anti-wetting polyvinyl alcohol layers through spray-coating with improved water permeability in membrane distillation, Desalination, Volume 545, article id. 116161 (2023); Wang et al., Spray-coated tough thin film composite membrane for pervaporation desalination, Chem. Engineer. Res. Design 179:493-501 (2022), each of which is incorporated by reference in its entirety for all purposes. Spray coating processes can be performed on commercially sold machines including, for example, SonoTek Corporation, SPS International, MTI Corporation, and Holmarc Opto-Mechatronics Ltd.

The thin films herein can be made on a substrate. The substrate can be a flexible sheet. The flexible sheet can be amenable to storage and winding onto a roll for use in a continuous roll-to-roll process. The flexible sheet can include, for example, a polyester film, a polyethylene terephthalate (PET) film, a biaxially oriented PET film, a polycarbonate, a polyethylene (including high density polyethylene, medium density polyethylene, low density polyethylene, linear low density polyethylene) film, a polyvinyl chloride film, a polyvinylidene chloride film, a polyvinylidene fluoride film, a nylon film, a polystyrene film, an acetate film, a polyurethane film, an ethylene vinyl acetate copolymer film, a cast polypropylene film, an uniaxially oriented polypropylene film and a biaxially oriented polypropylene films. The flexible sheet can include a release coating which can be a silicone release film, a polydimethyl siloxane (PDMS) coating, a fluorocarbon coating, a polyacrylate coating, a polystyrene coating, a polystyreneacrylic coating, a chromium sterate complex coating, or a polyolefin coating. Suitable release films include, but are not limited to those provided St. Gobain Performance Plastics, Worcester Mass., such as Saint Gobain 4130, 4159, 7819, 8310 release coatings.

Other materials may be substituted for the flexible sheet. Such other materials may be a paper or cellulosic substrate such as glassine or supercalendered kraft paper coated with a release coating.

The processes can form or deposit a second polymer layer (and/or multiple polymer layers) on the thin film. Which can be used to transfer the polyelectrolyte based film from the insoluble carrier substrate described above to a water soluble substrate. The water soluble polymer can be polyvinyl alcohol (PVA). The water soluble polymer can have a molecular weight of less than 23 kDa. The water soluble polymer can have a molecular weight such that it can be removed from the blood by renal filtration. As it is intended to readily dissolve, when exposed to moisture on a surface the bioactive nanoscale polymer layer is deposited conformally on the surface. In some aspects, the second polymer layer comprises polyacrylic acid (PAA), polyvinylpyrrolidone (PVP), carboxymethyl cellulose (CMC), hydroxypropyl cellulose, hydroxypropyl methylcellulose, methylcellulose, ethylcellulose, hydroxyethyl cellulose (HEC), alginates, polyvinylacetate (PVAc), polylactic acid (PLA), polylactic-co-glycolic acid (PLGA), polyglycolic acid, or polyanhydrides.

The secondary polymer film can have a thickness of from 1-100 μm, preferably 5-25 μm, and can be coated onto the hydrophilic polymer layer. The second polymer layer can be made of a hydrogel, a hydrocolloid, and/or a collagen and such a second layer can provide support to the hydrophilic polymer layer.

The second or additional polymer layer(s) can optionally be used to slow the release of metal, metal ion, and/or other additives from the thin film.

An adhesive material can also be added to the thin films herein so the film is not required to adhere to an underlying surface simply by dissolving with moisture. Adhesive materials include, for example, polyvinyl butyral (PVB), polyacrylates, polymethyl methacrylates, vinyl acetates, polyvinyl alcohol, and the like. The adhesive material can be added to the thin film by any methods known in the art.

The thin films made can be dried by methods such as, for example, vacuum annealing, with heat from a hotplate, furnace or oven, thin film dryer, hot-air flow, infared irradiation, exposure to ambient air, vacuum drum drying, refractance window drying, agitated thin film drying, etc. For example, the rate the film is moved through a drier and the temperature of that drier affect how much residual moisture is left in the thin film. The thin film is dried leaving enough remaining water that the thin film can wrap on top of itself, under tension, and not stick (referred to as blocking in the roll-to-roll world). The retained water can be 1-15%, 1-10%, 1-5%, 5-15%, 5-10%, 10-15%, 4-10%, 4-9%, 4-8%, 4-7%, 4-6%, 4-5%, 5-10%, 5-9%, 5-8%, 5-7%, 5-6%, 6-10%, 6-9%, 6-8%, 6-7%, 7-10%, 7-9%, 7-8%, 8-10%, 8-9%, 9-10%, 1%, 2%, 3%, 4%, 5%, 6%, 7%, 8%, 9%, 10%, 11%, 12%, 13%, 14%, 15%, 16%, 17%, 18%, 19%, 20% weight percent. The amount of water removed can be (percent of beginning water=100%) 60-95%, 65-95%, 70-95%, 75-95%, 80-95%, 85-95%, 90-95%, 60-90%, 65-90%, 70-90%, 75-90%, 80-90%, 85-90%, 60-85%, 65-85%, 70-85%, 75-85%, 80-85%, 60-80%, 65-80%, 70-80%, 75-80%, 60-75%, 65-75%, 70-75%, 60-70%, 65-70%, 60-65%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%. The amount of retained water is that needed to keep the tin film pliable and strong so that the thin film can be peeled from the substrate. When the thin film is overdried it becomes brittle and can shatter when it is separated from the substrate.

A freestanding sheet can be obtained by peeling the combined hydrophilic polymer layer and second polymer layer from the substrate. This freestanding film may be referred to as a microsheet. The substrate supporting the hydrophilic polymer layer and second polymer layer can be cut to a predetermined size and/or state before the microsheet is peeled away. The hydrophilic polymer layer of a microsheet can contain desired metal ions and/or other additives such as antimicrobial agents, antibiofilm agents, microparticles, nanoparticles, magnetic particles as described above. The microparticles or nanoparticles in the hydrophilic polymer layer can contain bioactive agents or antimicrobial agents. The second polymer layer can include an antibiofilm agent. For example, the antibiofilm agent can be a small molecule antibiofilm agent, a charged small molecule antibiofilm agent, an antibiofilm polypeptide, an antibiofilm enzyme (e.g., Dispersin B), a metallic particle, or a metal ion antibiofilm agent (e.g., a metal ion, metal ion salt, or metal ion nanoparticle). Further, the metal ion antibiofilm agent can be a gallium ion, a gallium ion salt, a gallium ion nanoparticle, an alloy of gallium, or an alloy of gallium and silver.

Desired metal atoms and/or other additives can be incorporated into the hydrophilic polymer layer or second polymer layer, referred to collectively as a thin film and/or microsheet. The description herein is not limited to a particular mechanism by which the metal atoms and/or other additives are released from the polymer layer(s). The mechanism by which release is achieved is not necessary to practice the embodiments described herein. Exemplary methods for release include, release of the one or more incorporated agents from the thin film by diffusion from the polymer layer. The metal atoms and/or other additive may be released from the polymer layer(s) over time or in response to an environmental condition. The metal atoms and/or other additive may be attached by a degradable linkage in a polymer layer, such as a linkage susceptible to degradation via hydrolysis or enzymatic degradation. The linkage may be one that is susceptible to degradation at a certain pH, for example.

Thin films made according to the methods herein described can have 1-5, 1-10, 1-15, 1-20, 1-25, 1-30, 1-35, 1-40, 1-45, 1-50, 5-10, 5-15, 5-20, 5-25, 5-30, 5-35, 5-40, 5-45, 5-50, 10-15, 10-20, 10-25, 10-30, 10-35, 10-40, 10-45, 10-50, 15-20, 15-25, 15-30, 15-35, 15-40, 15-45, 15-50, 20-25, 20-30, 20-35, 20-40, 20-45, 20-50, 25-30, 25-35, 25-40, 25-45, 25-50, 30-35, 30-40, 30-45, 30-50, 35-40, 35-45, 35-50, 40-45, 40-50, or 45-50 $\mu g/cm^2$ of active silver. Thin films made according to the methods herein described can have 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 $\mu g/cm^2$ of active silver. Thin films made according to the methods herein described can have 1-10, 1-20, 1-30, 1-40, 1-50, 5-10, 5-20, 5-30, 5-40, 5-50, 10-20, 10-30, 10-40, 10-50, 20-30, 20-40, 20-50, 30-40, 30-50, 40-50% desired metal (e.g., silver) by weight. Thin films made according to the methods herein described can have 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% desired metal (e.g., silver) by weight.

Uses for Thin Films

The disclosure provides a freestanding thin film of a desired size and shape including a desired metal ion (e.g., antimicrobial silver compounds, antimicrobial gallium compounds, etc.), and optionally including other additives (e.g., growth factors, peroxides, hemostatic agents, bioactive peptides, bioactive polypeptides, analgesics, anticoagulants, anti-inflammatory agents, drug molecules and/or drug compounds). The thin film may have a desired size and shape by cutting the substrate material to a desired size and shape and peeling the thin film from the substrate. The thin film may then be applied to an application site such as a wound or a medical surface such as the surface of a medical device.

A dressing for a wound can be biocompatible, acting as a physical barrier against microorganisms while allowing gas permeation to keep the wound hydrated and remove excess exudate. Additionally, desirable properties include good mechanical strength and flexibility. Non-toxicity, biocompatibility, and biodegradability are also important criteria for materials used in dressings.

The thin films described herein can be applied to a wound, a biologic tissue, a cornea, a lens, a bone, a tendon, a surgical mesh, a wound dressing, a biomedical device, a device used for healthcare, or other surface. The thin film can be functionalized. The thin film can have one or more polymers, preferably biocompatible, or is formed from one or more proteins, or is a combination of polymers and proteins. The thin film can be made of synthetic polymers such as synthetic polyelectrolytes. The thin can be made from naturally occurring polymers such as polysaccharides. A metal ion and/or other additives, for example, an antimicrobial agent such as polyhexamethylene biguanide (PHMB), chlorhexidine, or iodine compound, or an antibiotic, can be incorporated into the thin film. The metal ions and/or other additives can be impregnated, incorporated or interspersed throughout the three dimensional structure of the thin film. The thin film can be made of multiple layers of the same or different hydrophilic polymers.

The thin film can be used to modify a wound dressing or biologic wound dressing that is compatible with functionalization by addition of a matrix material. Examples of commercially available wound dressings that can be modified by addition of a thin film include, but are not limited to, Biobrane™, gauze, adhesive tape, bandages such as Band-Aids®, and other commercially available wound dressings including but not limited to COMPEEL®, DUODERM™, TAGADERM™, and OPSITE®. In an aspect, the disclosure provides methods for transferring a thin film herein to a desired surface, such as soft surface. Such soft surfaces include, but are not limited to, skin, a wound bed, a tissue, artificial tissues including artificial skin tissues such as organotypically cultured skin tissues, Apligraf®, Dermagraft®, Oasis®, Transcyte®, Cryoskin® and Myskin®, artificial tissue matrices, gels comprising biomolecules, a wound dressing, and a biologic wound dressing. The desired surface can be contacted with a thin film herein, e.g., a polymer multilayer supported on a support and pressure is applied to effect transfer of the polymer multilayer from the support to the desired surface. The transfer can be performed in the substantial, or complete, absence of solution. The transfer can be performed through a gas phase. The transfer can be performed in an environment where the humidity is less than 100% of saturation. The transfer can be performed in the absence of liquid water.

In an aspect, the disclosure herein provides wound dressings with a support material having a surface oriented to a wound, wherein the surface oriented to the wound is modified with a thin film material described herein. When applied to a wound, the surface of the support material modified with the matrix material is put into contact with the wound bed.

The support can be a biologic wound dressing. Biologic wound dressings can be of the type having, e.g., a coating or incorporates, cells (e.g., keratinocytes or fibroblasts and combinations thereof) and/or one or more biomolecules or fragments of biomolecules that can be placed in contact with the wound surface. The biomolecules may be provided in the form of an artificial tissue matrix comprising one or more biomolecules. Examples of such biomolecules include, but are not limited, to collagen, glycosaminoglycans, hyaluronic acid, laminin, vitronectin, fibronectin, keratin, antimicrobial polypeptides and combinations thereof. Examples of suitable biologic wound dressings include, but are not limited to, BIOBRANE™, Integra™, Apligraf®, Dermagraft®, Oasis®, Transcyte®, Cryoskin® and Myskin®.

The thin film can be used to modify a biosynthetic wound dressing constructed of an elastomeric film supported on support material, such as a fabric, preferably a polymeric fabric such as a nylon fabric. The fabric can be at least partially imbedded into the film (e.g., BioBrane™). The elastomeric film can be coated with one or more biomaterials, for example collagen, keratin, fibronectin, vitronectin, laminin and combinations thereof. Accordingly, the fabric presents to the wound bed a complex 3-D structure to which a biomaterial (e.g., collagen) has been bound, preferably chemically bound. The surface presented to the wound can be further modified with a thin film as described above. The thin film can be hydrophilic polymer layer comprising a metal ion and/or other additive, e.g., growth factors, peroxides, hemostatic agents, bioactive peptides, bioactive polypeptides, analgesics, anticoagulants, anti-inflammatory agents, drug molecules and/or drug compounds.

The thin films can be used to modify an adhesive bandage comprising an adhesive portion (such as an adhesive strip) and an absorbent material, preferably treated or coated with a material (i.e., a non-adherent material) to prevent adhesion to the wound or comprising a layer of non-adherent material, such as Teflon®, on the surface of the absorbent pad that will contact the wound. The absorbent material can be an absorbent pad (e.g., a gauze pad or polymer foam) preferably treated or coated with a material (i.e., a non-adherent material) to prevent adhesion to the wound or having a layer of non-adherent material, such as Teflon® or other suitable material, on the surface of the absorbent pad that will contact the wound. The non-adhesive material or layer can be breathable. The bandage can also have a wound dressing made from a gel-forming agent, for example, a hydrocolloid such as sodium carboxymethylcellulose. The absorbent pads or gel-forming agents can be affixed to a material that is waterproof and/or breathable. Examples include, but are not limited, semipermeable polyurethane films. The waterproof and/or breathable material may further include an adhesive material for securing the bandage to the skin of a subject. The waterproof and/or breathable material preferably forms the outer surface of the adhesive bandage or pad, i.e., is the surface opposite of the surface comprising the matrix which contacts the wound. Examples of such adhesive bandages and absorbent pads include, but are not limited to adhesive bandages and pads from the Band-Aid® line of wound dressings, adhesive bandages and pads from the Nexcare® line of wound dressings, adhesive bandages and non-adhesive pads from the Kendall Curity Tefla® line of wound dressings, adhesive bandages and pads from the Tegaderm® line of wound dressings, adhesive bandages and pads from the Steri-Strip® line of wound dressings, the COMFEEL® line of wound dressings, adhesive bandages and pads, the Duoderm® line of wound dressings, adhesive bandages and pads, the TEGADERM™ line of wound dressings, adhesive bandages and pads, the OPSITE® line of wound dressings, adhesive bandages and pads, adhesive bandages and pads from the Allevyn line of wound dressings, adhesive bandages and pads from the Duoderm® line of wound dressings, and adhesive bandages and pads from the Xeroform® line of wound dressings.

A thin film as described herein can be applied to a wound under conditions such that wound healing, as measured by wound contraction, is accelerated. The thin film containing metal ions and/or other additives can be transferred to a wound or tissue so that a second polymer layer lies on top of the hydrophilic polymer layer after transfer to the wound or tissue. A wound dressing can be placed on top of thin film. Optionally, the second polymer layer can be removed before or after the wound dressing is applied. The thin film with metal ions and/or other additives can be transferred to a wound or tissue surface such that the thin film dissolves completely in the wound, and optionally a primary/secondary wound dressing can be placed over the wound. The primary/secondary dressing can be a biologic dressing and the thin film does not hinder integration of biologic dressing in the wound-bed.

Metal ions and/or additives can play a critical role in each of the four stages of wound healing (hemostasis, inflammation, proliferation, tissue remodeling). The metal ion concentrations can be different in each stage. For example, partial bacteriostatic effects of silver ion are observed at concentrations as low as 0.5 ppm, while cell killing is observed at concentrations above 5 ppm.

The thin films with metal ions and/or other additives can be provided as kits, preferably with the thin film in a sterile package. The thin film provided in the kit can have at least one metal ion and/or other additive. The kits can include a metal ion and/or other additive with instructions for applying the metal ion or other additive to the thin film prior to application to a desired site (e.g., skin or wound).

A thin film as described herein, can be applied to all types surfaces, e.g., wounds, skin, surface of a medical device. Furthermore, a metal ion and/or other additive can be applied to skin, mucous membranes, body cavities, and to internal surfaces of bones, tissues, etc. that have been damaged. A thin film with one or more metal ions and/or other additives can be used on wounds such as cuts, abrasions, ulcers, surgical incision sites, burns, and to treat other types of tissue damage or conditions. The thin films disclosed herein can enhance wound healing. Wound healing may be enhanced in a variety of ways by the thin films disclosed herein. The thin films disclosed herein and methods using the thin films can minimize contracture of the wound as to best favor function and cosmesis. The thin films described herein and methods using the thin films can promote wound contracture to best favor function and cosmesis. The thin films described herein and methods using the thin films can promote vascularization. The thin films described herein and methods using the thin films can inhibit vascularization. The thin films described herein and methods using the thin films can promote fibrosis. The thin films described herein and methods using the thin films can inhibit fibrosis. The thin films described herein and methods using the thin films can promote epithelial coverage. The thin films described herein and methods using the thin films can inhibit epithelial coverage. The thin films described herein and methods using the thin films can modulate one or properties of cells in the wound environment or in the immediate vicinity of the wound. The properties that are modulated, e.g., are increased or decreased, include, but are not limited to adhesion, migration, proliferation, differentiation, extracellular matrix secretion, phagocytosis, MMP activity, contraction, and combinations thereof. The thin films described herein can be covered with a secondary dressing, or bandage, if it is desired to protect the layer or to provide additional moisture absorption.

Free-standing thin films described herein can be applied to a moist wound and bandaged over, where the oxidative nature of the film is beneficial in providing reactive oxygen species (ROS), optionally providing desired metal ion concentrations during different stages (e.g., of wound healing).

Free-standing thin films can be applied to dry skin affected by hyperkeratosis (including dermatitis, psoriasis, eczema, corns, calluses, ingrown nails, etc.) and either moistened or simply bandaged over whereby an additive, such as urea, can act as a humectant to draw moisture to the site. The thin films can also be used as a skin-contact layer to a complement a wound care product, for example a disposable bandage.

Various features and embodiments of the disclosure are illustrated in the following representative examples, which are intended to be illustrative, and not limiting. However, one skilled in the art will readily appreciate that the specific methods and results discussed are merely illustrative of the inventions as described more fully in the claims which follow thereafter. Unless otherwise indicated, the disclosure is not limited to specific procedures, materials, or the like, as such may vary. It is also to be understood that the terminology used herein is for the purpose of describing particular embodiments only and is not intended to be limiting.

EXAMPLES

Example 1: Making a Thin Film with PAH/PAA

A thin film is made from polyamine hydrochloride (PAH), a positively charged polymer (cation), and polyacrylic acid (PAA), a negatively charged polymer (anion). PAH/PAA can be assembled into a thin film in the pH range of 2-11, roughly. Sec, for example, Shiratori et al, pH-dependent thickness behavior of sequentially adsorbed layers of weak polyelectrolytes, 2000, Macromolecules 33:4213-4219, Choi et al., Influence of the Degree of Ionization on Weak Polyelectrolyte Multilayer Assembly, 2005, Macromolecules 38:116-124, each of which is incorporated by reference in its entirety for all purposes.

The pH can be above the pKa (~9.5) for PAH, so uncharged or partially ionized PAH can deposit on a hydrophobic surface (e.g., silicone). The pH should also be below 11, as above this pH polyallylamine carbonate can easily form which impairs the coating process.

The pH can be significantly below the pKa (~6.5) for PAA to protect carboxylate groups in the PAA from electrostatic binding using hydrogen, or a higher pH can be used and the carboxylate groups can be protected by counter-ions such as, for example, Na+, K+, Li+, Mg++, or Ca++. The rate of film growth is increased when the fraction of ionized and unprotected groups in both molecules are simultaneously reduced.

A thin layer of PAH (cation polymer) deposition fluid is applied to the silicone substrate. This thin film can be applied using, for example, spray, dip, gravure, curtain coating, slot die, or knife coating. The PAH deposition fluid is left on the silicone substrate for 10-15 seconds. A rinse of deionized water is applied to remove the excess PAH deposition fluid. The rinsed substrate is subject to a diffusion barrier removal step. The diffusion barrier removal step can use any method to remove the excess rinse solution including, for example, an air knife, a vacuum, a heated blower, a squeegee nip, and/or adding a lower boiling co-solvent such as alcohol. A thin film of PAA (anion polymer) deposition fluid is then applied to the substrate followed by a subsequent rinse step and diffusion barrier removal step. The PAA deposition fluid is left on the silicone substrate for 10-15 seconds. These steps are repeated as a cycle 15 times.

Example 2: Adding Silver Ion to a Thin Film

A thin film made according to Example 1 is subjected to a silver ion exchange process. A layer of silver ion solution is applied to the thin film. The silver ion solution is left on the thin film for 60 seconds so the silver ion can diffuse into the thin film and exchange with metal protector ions in the thin film. A rinse step removes the excess silver ion solution, and optionally the thin film is subjected to a diffusion barrier removal step (as described in Example 1). A reducing agent (electron donor) solution is then applied to the thin film. The reducing agent can reduce or eliminate the charge of the silver ion in the thin film. A rinse step removes the excess reducing agent solution, and optionally the thin film is subjected to a diffusion barrier removal step (as described above). The above steps (metal-rinse-reducing agent-rinse) are repeated for one to five cycles. The last cycle excludes the reducing agent step so that some silver ion is left in the thin film.

Example 3: Topcoating with a Water Soluble Transfer Film

A 20 wt % solution of Poval 4-98 polyvinyl alcohol is prepared by mixing 33.12 kg of dry Poval 4-98 granules, from Kuraray, into deionized water under constant agitation, in order to fully wet all granules individually. The dispersion is heated to 90° C. to fully dissolve the PVA granules. The solution is then allowed to cool to room temperature. The solution is cooled to 30° C. or less before further processing.

Poly(ethylene glycol), from Aldrich (p/n 202398) is then added to act as a humectant and plasticizer for the polyvinyl alcohol layer. The solution is allowed to stir and degas for 2 hours prior to application, after which it is pumped into the pan of a gravure coater (custom machine from SMBK (https://smbk.de/)) by means of a positive displacement transfer pump, and applied via direct gravure to the article prepared in Example 2, at a rate of 160 cm$^3$/m$^2$. The wet film is then dried in a convection drier, and wrapped under tension for storage.

Using a 2 m long drier, the thin film was passed through the drier at 3 m/min. The film was dried in 40 seconds and the film was re-wrapped immediately after the drier. The wet film of PVA contains about 80% water as it leaves the gravure. The final product contained 6-8 wt % residual water once dried. Less water content causes the thin film to become too brittle to separate the PVA layer (with the active silver on it) from the inert PET backing without shattering it into pieces. If the thin film has more than 8-10 wt % water and it will be too sticky to wrap without blocking. The drier temperature is set to evaporate 80% of the water in the film leaving 6-8% residual water in the thin film. For example, at a speed of 3 m/min, the drier temperature can be 90-95° C.

Sheets can be peeled free of the carrier substrate as needed, thus transferring the polyelectrolyte film from an insoluble carrier substrate to a water soluble substrate. If the thin film is over-dried it becomes too brittle to handle as a roll and can chatter when it is peeled from the backing.

All publications, patents, patent applications and other documents cited in this application are hereby incorporated by reference in their entireties for all purposes to the same extent as if each individual publication, patent, patent application or other document were individually indicated to be incorporated by reference for all purposes.

While various specific embodiments have been illustrated and described, it will be appreciated that various changes can be made without departing from the scope of the invention(s) of the disclosure.

What is claimed is:

1. A method for depositing a film on a hydrophobic silicone substrate, the method comprising:

(a) depositing a first deposition solution comprising at least one positively charged polymer, wherein the pH of the solution is at or above the $pK_a$ of the at least one positively charged polymer and wherein the first deposition occurs for about 8 seconds to about 30 seconds to form a first layer of said first deposition material;

(b) applying a rinse solution to remove any excess unbound polymer from the first deposition solution, allowing it to reside on the surface for a period of time $t_{rinse}$ of about 8-90 seconds;

(c) removing excess rinse solution using a diffusion barrier removal step whereby a layer of rinse solution of 2-5 microns is left on the positively charged polymer layer;

(d) depositing a second deposition solution comprising at least one negatively charged polymer, wherein the pH of the solution is at or above the $pK_a$ of the at least one negatively charged polymer, the second deposition solution contains a counterion for the at least one negatively charged polymer, wherein the counterion is provided by one or more of calcium nitrate, aluminum nitrate, copper chloride, magnesium chloride, manganese chloride, sodium chloride, calcium chloride, potassium chloride, copper sulfate, magnesium sulfate, sodium acetate, calcium acetate, sodium carbonate, potassium carbonate, calcium carbonate, or manganese carbonate, and wherein the second deposition occurs for about 8 seconds to about 30 seconds to form a second layer of said second deposition material;

(e) applying a rinse solution to remove any excess unbound negatively charged polymer from the second deposition solution, allowing it to reside on the surface for a period of time $t_{rinse}$ of about 8-90 seconds;

(f) removing excess rinse solution using a diffusion barrier removal step whereby a layer of rinse solution of 2-5 microns is left on a second layer made from the second deposition material;

(g) exposing the the second layer to a metal ion solution for a period of about 45 seconds to 3 minutes, whereby the counterion is exchanged for a metal ion from the metal ion solution;

(h) applying a first rinse solution to remove any unbound excess metal ions for a period of time $t_{rinse}$ equal to about 45 seconds to about 3 minutes;

(i) applying a reducing solution to the the second layer of the second deposition solution for a period of about 45 sec to 3 minutes;

(j) applying a second rinse solution for a period of time $t_{rinse}$ equal to about 45 seconds to about 3 minutes; and (k) drying to form a completed film.

2. The method of claim 1, wherein the metal ion replacing the counterion is selected from gallium ion, cerium ion, or silver ion.

3. The method of claim 1, wherein steps g-j are repeated for up to about five (5) cycles, prior to step (e).

4. The method of claim 2, wherein the metal ion solution comprises silver nitrate having a concentration between about 1 mM to about 10 mM.

5. The method of claim 1, wherein the reducing solution comprises sodium borohydride having a reductive potential between about −300 mV and about −500 mV.

6. The method of claim 1, wherein the completed film comprises dimensions that are at least one foot wide and at least three feet in length.

7. The method of claim 3, further comprising depositing a third deposition solution comprising a hydrophilic polymer and substantially drying it to form a layer of the hydrophilic polymer less than 5 mil (125 micron) thick.

8. The method of claim 7, wherein the hydrophilic polymer is a generally regarded as safe hydrophilic polymer.

9. The method of claim 7, wherein the hydrophilic polymer is a polyvinyl alcohol.

10. The method of claim 7, further comprising blending an additive into the solution of hydrophilic polymer so that the additive incorporates into the completed film.

11. The method of claim 10, wherein the additive is an antibiotic, a salicylic acid, a hydroquinone, a retinoid, a hyaluronic acid, or a vitamin C.

12. The method of claim 1, wherein steps a-f are repeated for up to 50 cycles, prior to step g.

13. The method of claim 1, wherein the at least one positively charged polymer achieves its charge from some combination of primary amine, secondary amine, tertiary amines, imine, amido, or amine or is selected from poly (allylamine hydrochloride) (PAH), poly-lysine (PLL), linear or branched poly(ethylene imine) (PEI), poly(histidine), poly(N,N-dimethyl aminoacrylate), poly(N,N,N-trimethyl-aminoacrylate chloride), poly(methyacrylamidopropyltrim-ethyl ammonium chloride), and chitosan.

14. The method of claim 13, wherein the one positively charged polymer is poly(allylamine hydrochloride) (PAH).

15. The method of claim 1, wherein the at least one negatively charged polymer is selected from poly(acrylic acid) (PAA), alginate, hyaluronic acid, heparin, heparin sulfate, chondroitin sulfate, dextran sulfate, poly(meth-acrylic acid), oxidized cellulose, carboxymethyl cellulose, polyaspartic acid, and polyglutamic acid.

16. The method of claim 15, wherein the one negatively charged polymer is poly(acrylic acid) (PAA).

17. The method of claim 1, wherein the second deposition solution comprises calcium nitrate.

* * * * *